Sept. 8, 1931.     F. H. OWENS     1,822,417
OPTICAL PRINTER
Filed May 14, 1929

INVENTOR.
FREEMAN H OWENS
BY
ATTORNEY.

Patented Sept. 8, 1931

1,822,417

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

OPTICAL PRINTER

Application filed May 14, 1929. Serial No. 363,082.

My invention relates to an optical printer and has for its principal object the provision of a novel arrangement of means for continuously and optically printing or exposing the images from a negative film to a positive film. The invention is particularly adapted for motion picture films either in the projected printing of the usual visual images of motion picture film, or sound records.

It has long been a problem in connection with continuous projection printers to provide means whereby the projected images can be printed from one moving film to another in spaced relation, both the negative and positive films being driven synchronously and at exactly the same speed. Effort has been made to provide such a printing apparatus wherein a single sprocket moves both films simultaneously, but in such attempts, it has been difficult to adequately hurdle the sprocket shaft, or if the printing operation is performed above or below the single driving sprocket, to secure the full advantage of the single driving means.

It is an object of my invention to provide a single sprocket driving means for both negative and positive films and to provide an optical system for the projection of the images through the center of the sprocket at right angles to the teeth thereof. By this means, the projection of an image can be made directly from the point where the negative film engages the sprocket to the positive film at the point where it engages the sprocket, thus insuring perfect synchronous movement of the two films.

By this means also, I eliminate the necessity of hurdling the sprocket shaft or other supporting means by complicated lens systems.

My invention also contemplates the provision of an optical printer of this character, by means of which reduction or enlarging printing may be accomplished. The apparatus which I use readily lends itself to the adjustment of the optical system, particularly the focusing lens, by means of which the reduction or enlargement printing can be made with surety of focus.

Other objects and advantages in details of construction and arrangement of parts will be apparent as the description proceeds, reference now being had to the figures of the accompanying drawings forming a part of this application, and wherein like reference numerals indicate like parts.

In the drawings:—

Figure 1:
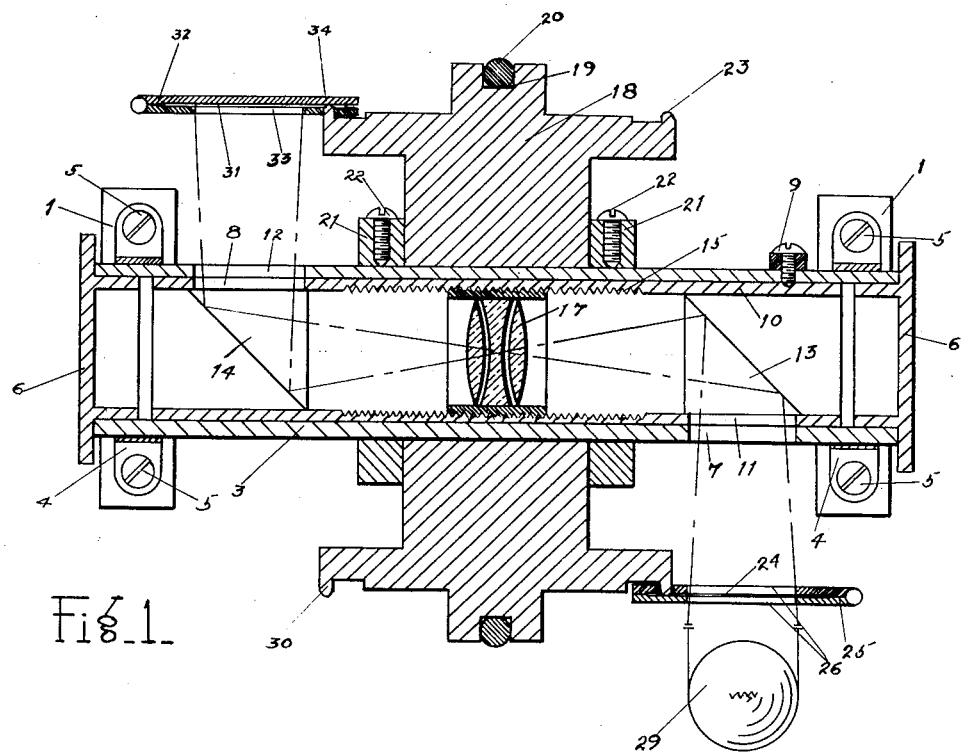
Figure 1 is a sectional plan view illustrating an embodiment of my improved printer.
Figure 2:
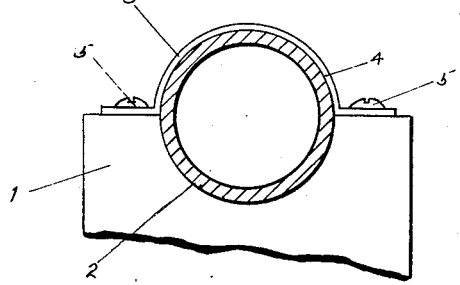
Figure 2 is a detail end view illustrating one method of securing the tubular bearing forming a part of the printer, in position.
Figure 3:
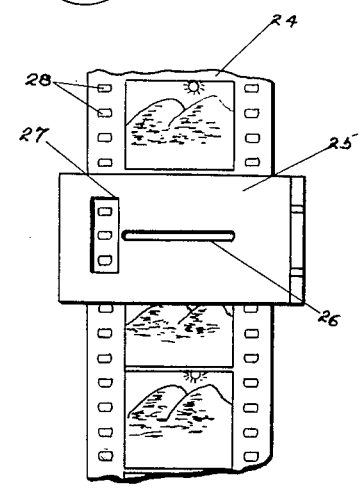
Figure 3 is a detail view illustrating a section of motion picture film and the film gate or guide through which the same passes.

In carrying out my invention, spaced supporting posts 1 may be provided, the upper ends of which are recessed as at 2, to receive a tubular bearing 3, which may be rigidly secured to the supporting posts as by means of straps 4, passing over the tube 3 and secured to the upper ends of the posts as by screws 5. The end of the tubes 3 may be closed by suitable caps 6 which may be readily removed to permit access to the interior of the tube.

The tube 3 is provided adjacent one end with a slit opening 7 and adjacent the opposite end of the tube and on the opposite side from the opening 7 with a second slit opening 8.

Secured within the tube 3 as by means of the set screw 9 is a sleeve 10, extending substantially the length of the tube and provided with slit openings 11 and 12 registering with the openings 7 and 8 respectively.

Suitably secured within the sleeve 10 at a point overlying the opening 7 is a prism or other reflecting device 13 so positioned as to receive illuminated images passing into the tube and sleeve from the outside, through the slit openings 7 and 11, and to reflect such images longitudinally through the tube. A second prism or other reflecting surface 14 is suitably mounted within the sleeve 10 adjacent its opposite end and in position to receive the reflected images from the prism 13 and to reflect such images outwardly through the slit openings 8 and 12.

The interior of the sleeve 10 is preferably threaded centrally as at 15 to adjustably receive a threaded lens mount 16 carrying the focusing lens system 17. This provides means for properly focusing the reflected images from the prism 13 upon the prism 14 and for adjusting such focusing lens to the proper focusing position within the sleeve.

Rotatably mounted upon the tube 3 is a sprocket 18 which may be provided peripherally with a pulley groove 19 adapted to receive a belt 20 connected to any suitable source of power whereby the sprocket 18 may be rotated upon the tube 3. Adjustable guiding collars 21 may be provided on the tube 3 and fixed in adjusted position by means of the set screws 22 whereby longitudinal movement of the sprocket 18 upon the tube after it has been properly set and adjusted, is prevented.

The sprocket teeth 23 on one side of the sprocket are adapted to engage and move a negative motion picture film 24, such movement at the point of engagement with the sprocket being through a film gate 25, provided with a slit opening 26 extending across the width of the picture images on the film 24. The film gate 25 is also provided with a vertical slot 27 in alignment with the perforations 28 on one side of the film whereby to permit engagement of the sprocket teeth 24 with such perforation through the gate.

A lamp or other light source 29 may be provided to illuminate the negative film passing the slit opening 26 in the gate 25 and it will be understood of course that any suitable lens system for intensifying and focusing the light upon the slit 26 may be interposed between the lamp 29 and film gate. As is apparent from Figure 1 of the drawings, the slit 26 in the film gate is in direct alignment with the slit openings 7 and 11 in the tube and sleeve respectively, whereby the illuminated images of the negative film 24 are projected to the reflecting prism 13 and thus through the focusing lens 17 to the prism 14 where such images are reflected outwardly through the slit openings 8 and 12.

The sprocket teeth 30 on the opposite side of the sprocket 18 are adapted to engage and move a strip of positive film 31, guided at its point of engagement with the sprocket, through a film gate 32, provided with a slit opening 33, through which the projected and reflected images of the film 24 may be exposed upon the positive film 31. This film gate 32 is also provided with a vertical slit 34 to permit the sprocket teeth 30 to engage the film through the film gate.

The sprocket teeth 23 are cut on a diameter slightly less than the diameter of the teeth 30. This is to compensate for the shrinkage of the negative film 24, bringing the perforations therein slightly closer together than those of the fresh and undeveloped positive film. Thus, I compensate for this shrinkage with the sprocket and it will be understood that a plurality of sprockets may be provided with the negative teeth cut on various diameters and which can be selected to suit negatives of various stages of shrinkage.

Therefore, with the optical system properly focused, the illuminated images of the negative film 24 may be projected and exposed upon the positive film 31 at a rapid rate of speed, and without interference from the sprocket which moves the two films simultaneously and synchronously.

Of course, many structural changes may be made in details without departing from the spirit and scope of my invention. I do not limit myself, therefore, to the exact form herein shown and described other than by the appended claims.

I claim:

1. An optical printer comprising a single film moving member adapted to engage films in definite spaced relation, means for illuminating one film, and a lens to pass light from the illuminated film to the other film at right angles to said moving member and longitudinally of the axis of rotation thereof.

2. An optical printer comprising a single rotating member adapted to engage and move films in definite spaced relation, means for illuminating one of said films while it is engaged by said member, and a lens to pass light from the illuminated film to the other film at right angles to said rotating member and longitudinally of the axis of rotation thereof.

3. An optical printer comprising a single rotating member adapted to engage and move films in definite spaced relation, a fixed hollow bearing upon which said member is rotatable, means for illuminating one of the films, and optical means in said bearing to pass light from the illuminated film to the other film longitudinally through said bearing.

4. An optical printer comprising a single rotating member adapted to engage and move films in definite parallel spaced relation but offset laterally from each other, means for illuminating one film, and a lens for passing light laterally from said illuminated film to the other film.

5. An optical printer comprising a single rotating member adapted to engage and move films in definite parallel spaced relation but offset laterally from each other, a hollow bearing upon which said member is rotatable, means for illuminating one film, and optical means in said bearing for passing light from the illuminated film longitudinally to the other film through said bearing.

6. An optical printer comprising a single rotatable sprocket, the teeth on one end only of which engages and moves a negative film and the teeth on the other end only of which engages and moves a positive film, means for illuminating the negative film, and optical means for passing light from said negative film to said positive film longitudinally of the axis of said sprocket.

7. An optical printer comprising a single rotatable sprocket, the teeth on one end only of which engages and moves a negative film and the teeth on the other end only of which engages and moves a positive film, a hollow bearing upon which the sprocket is rotatable, means for illuminating the negative film, and optical means in said bearing for passing light from said negative film to said positive film longitudinally through said bearing.

8. An optical printer comprising a single rotatable sprocket, the teeth on one end only of which engages and moves a negative film and the teeth on the other end only of which engages and moves a positive film, a hollow bearing upon which the sprocket is rotatable, means for illuminating the negative film, and optical means in said bearing for passing light from said negative film to said positive film longitudinally through said bearing, said bearing having slit openings adjacent opposite ends and on opposite sides thereof to permit the passage of said light.

9. An optical printer comprising a single rotating member adapted to engage and move films in definite spaced parallel relation but offset laterally from each other, a hollow bearing upon which said member rotates, means for illuminating one of said films, a lens in said bearing, and reflecting means in said bearing for reflecting light from said illuminated film to said lens and from said lens to the other film said reflected light passing longitudinally through said bearing.

10. An optical printer comprising a single rotating member adapted to engage and move films in definite spaced parallel relation but offset laterally from each other, a hollow bearing upon which said member rotates, means for illuminating one of said films, a lens in said bearing, and reflecting means in said bearing for reflecting light from said illuminated film to said lens and from said lens to the other film, said lens being adjustable in said bearing.

11. An optical printer comprising a single rotating member adapted to engage and move films in definite spaced relation, a fixed hollow bearing upon which said member is rotatable, means for illuminating one of the films, and optical means in said bearing to pass light from the illuminated film to the other film, said rotating member being adjustably guided on said bearing.

12. An optical printer comprising a single rotatable sprocket, the teeth on one end of which engages and moves a negative film and the teeth on the other end of which engages and moves a positive film, means for illuminating the negative film, and optical means for passing light from said negative film to said positive film, the diameter of said sprocket including the teeth engaging said negative film being of less diameter than those engaging said positive film, to compensate for shrinkage in said negative film.

In testimony whereof, I affix my signature.

FREEMAN H. OWENS.